United States Patent
He

(10) Patent No.: US 9,283,742 B2
(45) Date of Patent: Mar. 15, 2016

(54) FILM PEELING APPARATUS AND FILM PEELING METHOD

(71) Applicants: BOE TECHNOLOGY GROUP CO., LTD., Beijing (CN); HEFEI BOE DISPLAY LIGHT CO., LTD., Hefei, Anhui (CN)

(72) Inventor: Tao He, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 30 days.

(21) Appl. No.: 14/316,155

(22) Filed: Jun. 26, 2014

(65) Prior Publication Data

US 2015/0306864 A1 Oct. 29, 2015

(30) Foreign Application Priority Data

Apr. 25, 2014 (CN) .......................... 2014 1 0172661

(51) Int. Cl.
*B32B 38/10* (2006.01)
*B32B 43/00* (2006.01)

(52) U.S. Cl.
CPC .............. *B32B 43/006* (2013.01); *B32B 38/10* (2013.01); *Y10T 156/1174* (2015.01); *Y10T 156/195* (2015.01); *Y10T 156/1978* (2015.01)

(58) Field of Classification Search
CPC B32B 38/10; B32B 43/006; Y10T 156/1944; Y10T 156/195; Y10T 156/1978; Y10T 156/1195; Y10T 156/1174
USPC .......... 156/715, 719, 759, 764, 767, 924, 937
See application file for complete search history.

(56) References Cited

U.S. PATENT DOCUMENTS

| | | | | |
|---|---|---|---|---|
| 5,643,380 | A * | 7/1997 | Saitoh | B41J 11/0015 134/15 |
| 2002/0108282 | A1* | 8/2002 | Kao | G07F 17/16 40/472 |
| 2004/0112534 | A1* | 6/2004 | Koizumi | B65H 5/025 156/750 |
| 2006/0027333 | A1* | 2/2006 | Takami | B65C 11/0289 156/764 |
| 2011/0185870 | A1* | 8/2011 | Yu | B26D 7/0625 83/174 |

FOREIGN PATENT DOCUMENTS

| | | |
|---|---|---|
| CN | 1940604 A | 3/2007 |
| CN | 103223765 A | 7/2013 |
| CN | 203319371 U | 12/2013 |
| CN | 203561807 U | 4/2014 |

OTHER PUBLICATIONS

The Chinese First Office Action issued Jul. 30, 2015 for Chinese priority application No. 201410172661.2.

\* cited by examiner

*Primary Examiner* — Philip Tucker
*Assistant Examiner* — Nickolas Harm
(74) *Attorney, Agent, or Firm* — Kinney & Lange, P.A.

(57) ABSTRACT

A film peeling apparatus is provided. The film peeling apparatus comprises: a film peeling roller which is sticky; at least one peeling belt which is non-sticky; at least one first rotation shaft which is configured to drive the peeling belt to rotate, wherein when the film peeling roller rotates, the film peeling roller sticks to the film peeling belt and a release film such that the release film is peeled from an original film.

11 Claims, 5 Drawing Sheets

FILM PEELING APPARATUS AND FILM PEELING METHOD

CROSS-REFERENCE TO RELATED APPLICATION

This application claims the benefit of Chinese Patent Application No. 201410172661.2 filed on Apr. 25, 2014 in the State Intellectual Property Office of China, the whole disclosure of which is incorporated herein by reference.

BACKGROUND OF THE INVENTION

1. Field of the Invention

The present disclosure relates to a technical field of material film peeling, more particularly, relates to a film peeling apparatus and a film peeling method.

2. Description of the Related Art

In a process for producing liquid crystal display products, it is necessary to use a great deal of optical film material, for example, a diffusing film, a reflecting film or a polarization film, to produce components such as a light guide plate, a liquid crystal panel of the liquid crystal display apparatus. As the above optical film material may be damaged easily, release films (or protective films) composed of PE (polyethylene) or PET (polyethylene terephthalate) need to be adhered to upper and lower surfaces of the optical film material before the optical film material is used and the release films must be peeled from the surfaces of the optical film material as an original film when it is used.

In the conventional peeling technology, as illustrated in FIG. 1, the original film 11 adhered with the release film 10 moves in a direction for peeling the film (X direction) and is adhered to a sticky tape 13 during the movement. When the original film 11 adhered with the release film 10 moves to a peeling location, the moving angle of the tape 13 changes suddenly (upwards in Y direction) and the release film 10 is separated from the original film 11 moving in the direction for peeling the film due to the adhesive force from the tape 13 to achieve peeling. However, as the tape 13 has the adhesive force, the release film 10 adhered to the tape 13 may be contaminated and the release film 10 will have a crease or scratch if it is torn from the tape 13 by manual such that the release film 10 will not be used repeatedly. Thus, the release film 10 has a low chance of being reused and the producing costs become high.

SUMMARY OF THE INVENTION

In order to solve the above technical problem, an embodiment of the present invention provides a film peeling apparatus and a film peeling method that can recycle the release film after it is peeled from the surface of the original film.

According to an aspect of the present disclosure, there is provided a film peeling apparatus, comprising:

a film peeling roller which is sticky;

at least one peeling belt which is non-sticky;

at least one first rotation shaft which is configured to drive the peeling belt to rotate, wherein when the film peeling roller rotates, the film peeling roller sticks to the film peeling belt and a release film such that the release film is peeled from an original film.

According to another aspect of the present disclosure, there is provided a film peeling method for a film peeling apparatus, the method comprising:

rotating a film peeling roller which is sticky and a first rotation shaft; and driving at least one non-sticky peeling belt to rotate by the first rotation shaft;

when the film peeling roller rotates, the film peeling roller sticks to the film peeling belt and a release film such that the release film is peeled from an original film.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
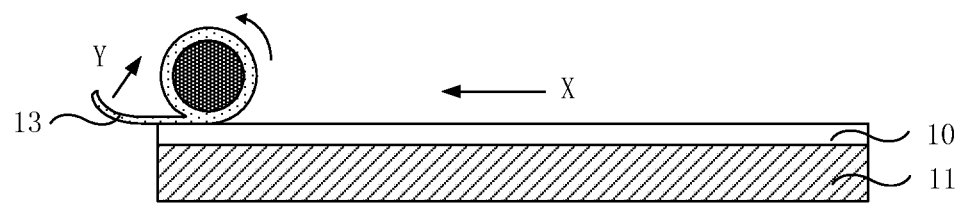
FIG. 1 is a schematic view showing a film peeling method in prior art.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general technical concept of the present invention, it provides a film peeling apparatus, comprising: a film peeling roller which is sticky; at least one peeling belt which is non-sticky; at least one first rotation shaft which is configured to drive the peeling belt to rotate, wherein when the film peeling roller rotates, the film peeling roller sticks to the film peeling belt and a release film such that the release film is peeled from an original film.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
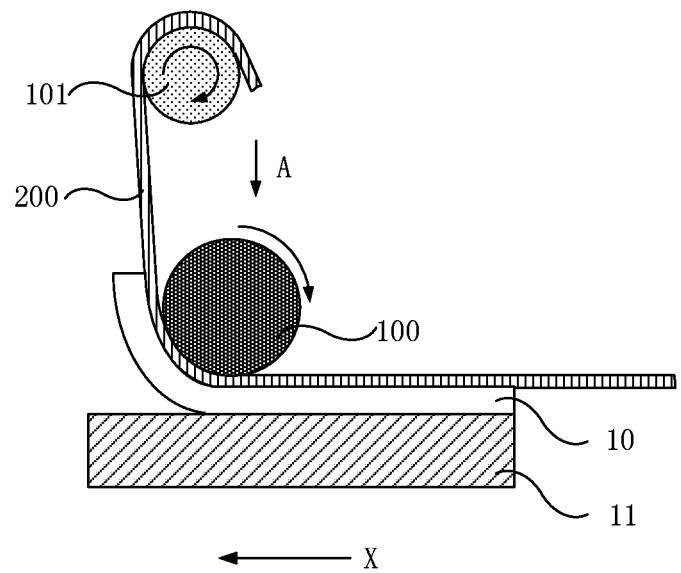
FIG. 2 is a schematic sectional view of a first film peeling apparatus in accordance with an embodiment of the present invention.

FIG. 2 is a schematic sectional view of a first film peeling apparatus in accordance with an embodiment of the present invention. The film peeling apparatus according to the embodiment comprises: a film peeling roller 100 which is sticky; at least one peeling belt 200 which is non-sticky; at least one first rotation shaft 101 which is configured to drive the peeling belt to rotate, wherein when the film peeling roller 100 rotates, the film peeling roller 100 sticks to the film peeling belt 200 and a release film 10 such that the release film 10 is peeled from an original film 11.

As illustrated in FIG. 2, the film peeling roller 100 is located on the surface of the original film 11 at the side with the release film 10. It should be noted that the film peeling roller 100 may be made from rubber sticky roller material and may have a viscosity that can stick an object of 8-10 g. And the film peeling roller 100 may remain the viscosity in a certain lifetime such that it can be recycled. The lifetime is associated with the material from which the film peeling roller 100 is made.

In rotation of the film peeling roller 100, the peeling belt 200 and the release film 10 are adhered to each other. As the film peeling roller 100 is sticky, the film peeling roller 100 contacts with the peeling belt 200 and the release film 10 in the rotation of the film peeling roller 100 such that the peeling belt 200 and the release film 10 are adhered to each other. In this way, the peeling belt 200 may pull the release film 10 off the surface of the original film 11 by an upward pulling force in movement such that the release film 10 is peeled from the surface of the original film 11.

It should be noted that in all of figures in the embodiment of the present invention, the X direction is the direction for peeling the film from the original film 11. As the peeling belt 200 is non-sticky, the peeling belt 200 and the release film 10 both are separated from the surface of the film peeling roller 100 after the peeling belt 200 peels the release 10 from the original film 11. Thus, the peeled release film 10 may be recycled. The recycled release film 10 may be reused and the original film may also be reused, thereby reducing the cost of material consumption.

Figure 3:
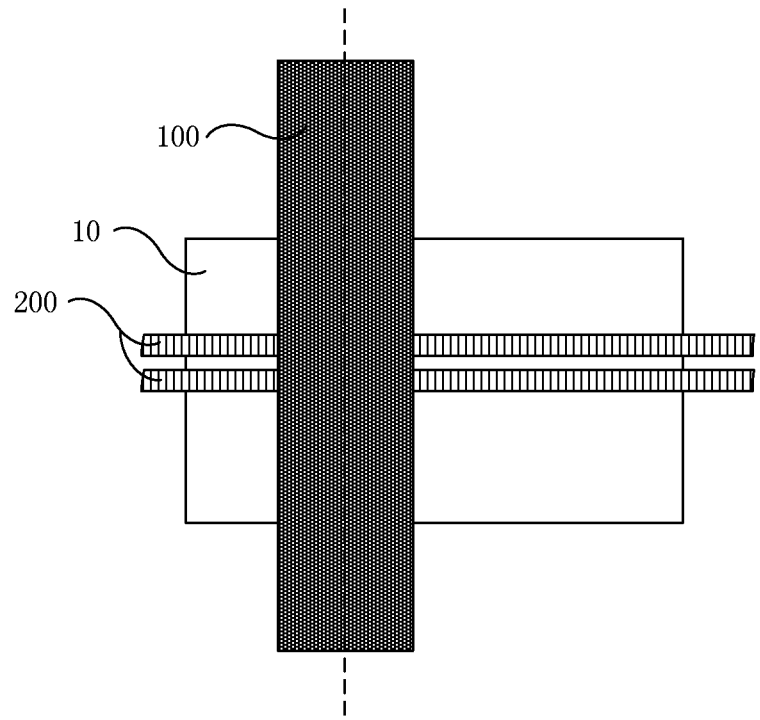
FIG. 3 is a top view of the film peeling apparatus shown in FIG. 2 in A direction.

FIG. 3 is a top view of the film peeling apparatus shown in FIG. 2 in A direction. FIG. 3 shows a width ratio of the peeling belt 200 to the release film 10. The embodiments of the present invention are all explained with reference to two peeling belts 200.

Figure 4:
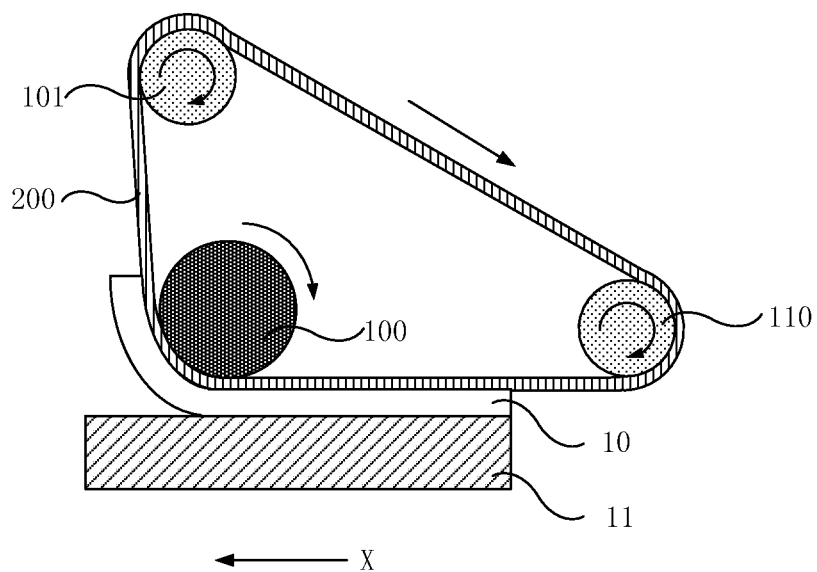
FIG. 4 is a schematic sectional view of a second film peeling apparatus in accordance with an embodiment of the present invention.

FIG. 4 is a schematic sectional view of a second film peeling apparatus in accordance with an embodiment of the present invention. The second film peeling apparatus may further comprise:

at least one supporting shaft 110 configured to allow the peeling belt 200 to rotate about the film peeling roller 100, the first rotation shaft 101 and the supporting shaft 110.

And, the supporting shaft 110 has an axis (not shown in FIG. 4) in parallel to the axis (not shown in FIG. 4) of the first rotation shaft.

Thus, as long as a section of peeling belt 200 is wound on the film peeling roller 100, the first rotation shaft 101 and the supporting shaft 110 to achieve the movement of rotation, the peeling belt 200 may be recycled. In addition, different positions and dimensions of various components of the film peeling apparatus may be adapted by adjusting the distance among the supporting shaft 110, the film peeling roller 100 and the first rotation shaft 101.

Figure 5:
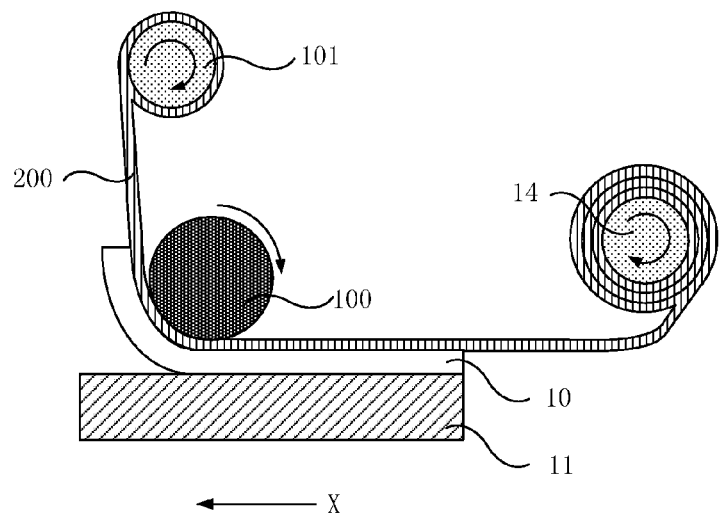
FIG. 5 is a schematic sectional view of a third film peeling apparatus in accordance with an embodiment of the present invention.

FIG. 5 is a schematic sectional view of a third film peeling apparatus in accordance with an embodiment of the present invention. When the first rotation shaft 101 rotates, the peeling belt 200 may be wound on the first rotation shaft 101 such that the peeling belt 200 is recycled. Further, a feeding roller 14 is arranged on one side of the film peeling roller 100, for providing the peeling belt 200 to be unwound. During peeling film, when all of the peeling belts 200 have been wound on the first rotation shaft 101, the roll-shaped peeling belt 200 on the first rotation shaft 101 is taken off and mounted onto the feeding roller 14. In this way, the peeling belt 200 can be recycled.

Figure 6:
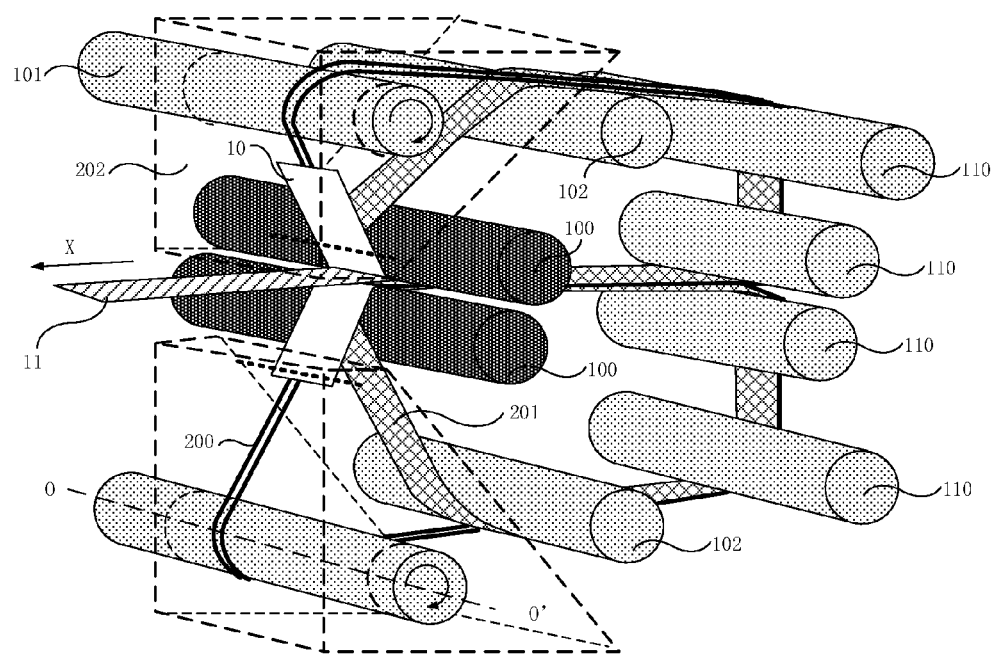
FIG. 6 is a schematic perspective view of a fourth film peeling apparatus in accordance with an embodiment of the present invention.

In a further embodiment, as illustrated in FIG. 6, it shows a fourth film peeling apparatus according to an embodiment of the present invention. The film peeling apparatus further comprises a positioning belt 201 and at least one second rotation shaft 102.

The positioning belt 201 is in contact with the peeling belt 200. And they both rotate about the second rotation shaft 102, the supporting shaft 110 and the film peeling roller 100. The positioning belt 201 limits the movement of the peeling belt 200 along the axial direction of the first rotation shaft 101 (as indicated by dashed line O-O' in FIG. 6).

It should be noted that both the upper surface and the lower surface of the original film 11 may be adhered with the release film 10. Thus, the film peeling apparatus for peeling the release film 10 may be provided symmetrically on the upper surface and the lower surface of the original film 11. For example, the film peeling apparatus located on the upper surface of the original film 11 comprises: the film peeling roller 100, the first rotation shaft 101, the second rotation shaft 102, two supporting shafts 110, the peeling belt 200 wound on the above components for rotating and the positioning belt 201 contacting with the peeling belt 200 and wound on the film peeling roller 100, the second rotation shaft 102 and the two supporting shafts 110 to rotate.

The second rotation shaft 102 has an axis (not shown) in parallel to that (O-O') of the first rotation shaft 101. Thus, the positioning belt 201 may limit the movement of the peeling belt 200 in the axial direction of the first rotation shaft 101. If the peeling belt 200 moves in the axial direction of the first rotation shaft 101, it will be misaligned with the release film 10 such that the release film 10 cannot be peeled from the original film 11 to cause failure of the film peeling process.

In particular, when both the peeling belt 200 and the positioning belt 201 rotate about the film peeling roller 100, the second rotation shaft 102 and the supporting shaft 110, the peeling belt 200 and the positioning belt 201 are in contact with each other and the positioning belt 201 limits the position of the peeling belt 200. When the peeling belt 200 is wound on the first rotation shaft 101, the peeling belt 200 is separated from the positioning belt 201 and contacts with the release film 10 such that the release film 10 may be peeled by the peeling belt 200 from the surface of the original film 11.

Figure 7:
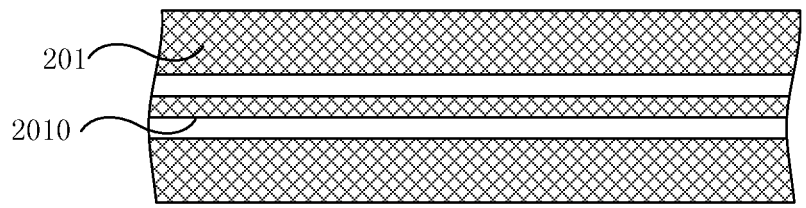
FIG. 7 is a schematic plan view of a first positioning belt in accordance with an embodiment of the present invention.

Further, as illustrated in FIG. 7, the surface of the positioning belt 201 in contact with the peeling belt 200 may be provided with at least one groove 2010 within which the peeling belt 200 is fixed. The number of the groove 2010 is equal to that of the peeling belt 200. Thus, the peeling belt 200 may be fixed in the groove 2010 of the positioning belt 201 to prevent the peeling belt 200 from moving in the axial direction of the first rotation shaft 101 during rotating along with the first rotation shaft 101.

Figure 8:
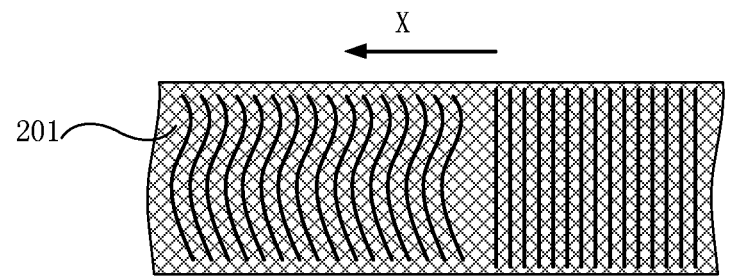
FIG. 8 is a schematic plan view of a second positioning belt in accordance with an embodiment of the present invention.

Further, as illustrated in FIG. 8, the surface of the positioning belt 201 in contact with the peeling belt 200 may be provided with at least one pattern which is configured to increase a frictional force between the peeling belt 200 and the positioning belt 201.

The pattern may comprise a plurality of strip graphs or torturous graphs angled with respect to the movement direction of the peeling belt 200. It should be noted that the movement direction of the peeling belt 200 may be the direction X for peeling the film from the original film 11. Due to effects of the pattern, the frictional force on the contacting faces of the positioning belt 201 and the peeling belt 200 are increased and a preset angle may be provided according to practical requirement. For example, in FIG. 8, when the angle between the plurality of strip graphs or torturous graphs on the pattern and the movement direction of the peeling belt 200 is 90 degrees, the frictional force may meet the requirement for limiting the movement of the peeling belt 200 along the axial direction of the first rotation shaft 101. Thus, the above preset angle may be arranged at 90 degrees. However, it is only an example of the preset angle, and other preset angles may also be used, which also fall within the scope of the present invention.

In this way, by means of the above pattern, the frictional force on the contact faces of the positioning belt 201 and the peeling belt 200 may be increased and thus the position of the peeling belt 200 may be fixed to prevent the peeling belt 200 from moving in the axial direction of the first rotation shaft 101 during rotating along with the first rotation shaft 101.

Further, as illustrated in FIG. 6, the above film peeling apparatus may further comprise a recycling box 202.

The first rotation shaft 101 is located within the recycling box 202 such that the peeling belt 200 wound on the surface of the first rotation shaft 101 can bring the release film 10 adhered to the peeling belt 200 into the recycling box 202.

Figure 9:
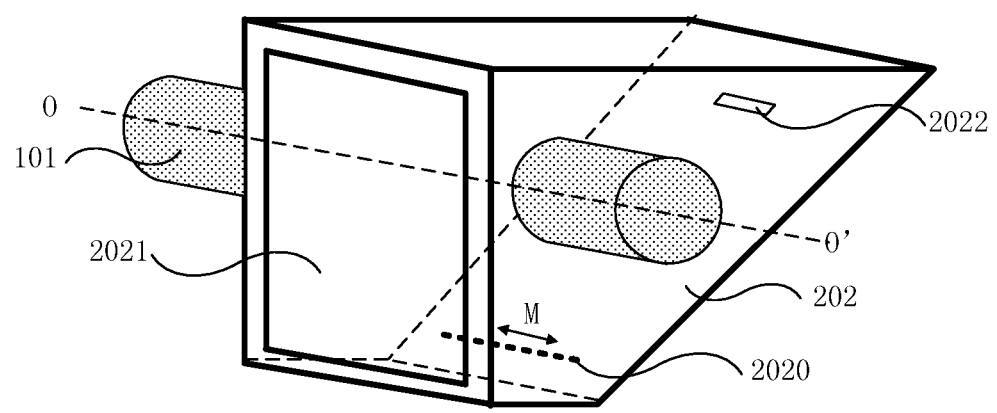
FIG. 9 is a schematic perspective view of a recycling box according to an embodiment of the present invention.

As illustrated in FIG. 9, the recycling box 202 is provided with a recycling opening 2020. The recycling opening 2020 is open in a direction (M direction) in parallel to the axis (O-O') of the first rotation shaft. During rotation of the first rotation shaft 101, the release film 10 is brought into the recycling box 202 through the recycling opening 2020 by the peeling belt 200 and falls within the recycling box 202. As the peeling belt 200 is non-sticky, the release film 10 will fall into the recycling box 202 automatically after the release film 10 is peeled by the peeling belt 200 from the surface of the original film 11 and is brought into the recycling box 202. In this way, the release film 10 may be recycled to improve the chance of being reused and reduce costs. In addition, as all of the peeled release films 10 have recycled into the recycling box 202, the release film 10 may be prevented from being polluted by other contaminations in the processing environments.

Further, the recycling box 202 may be further provided with an extracting port 2021 configured to take out the release film 10 fallen within the recycling box 202. In this way, it may prevent creases or scratches on the surface of the release film 10 due to excessive accumulation of the release films 10 in the recycling box 202.

Further, in order to allow the peeling belt 200 to rotate continuously, a peeling belt exit 2022 may be provided on the recycling box 202. The peeling belt exit 2022 is configured to convey the peeling belt 200 out of the recycling box 202. In this way, the peeling belt 200 may rotate continuously about the film peeling roller 100, the first rotation shaft 101, the second rotation shaft 102 and the supporting shaft 110 to achieve recycling of the peeling belt 200.

It should be noted that the shape of the recycling box 202 and the positions of the recycling opening 2020, the extracting port 2021 and the peeling belt exit 2022 are not limited in the present disclosure. They may be adjusted by the skilled person in the art as required.

Figure 10:
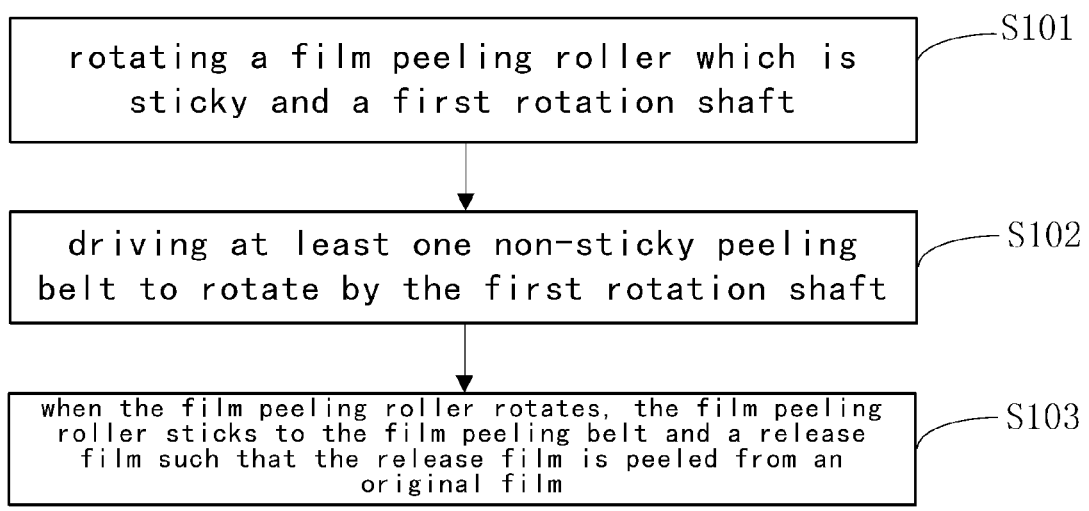
FIG. 10 is an illustrative flow chart of a film peeling method for a film peeling apparatus according to an embodiment of the present invention.

An embodiment of the present invention provides a film peeling method for a film peeling apparatus. As illustrated in FIG. 10, the method comprises: rotating a film peeling roller which is sticky and a first rotation shaft S101; driving at least one non-sticky peeling belt to rotate by the first rotation shaft S102; and when the film peeling roller rotates, the film peeling roller sticks to the film peeling belt and a release film such that the release film is peeled from an original film S 103.

As the peeling belt 200 is non-sticky, the peeling belt 200 and the release film 10 are both separated from the surface of the film peeling roller 100 after the peeling belt 200 peels the release 10 from the original film 11. Thus, the peeled release film 10 may be recycled and the original film may also be reused, thereby reducing the cost of material consumption and improving the chance of being reused.

In particular, when the film peeling roller 100 contacts with both the peeling belt 200 and the release film 10 in the rotation, the peeling belt 200 and the release film 10 are adhered to each other. In this way, the peeling belt 200 may pull the release film 10 off the surface of the original film 11 by an upward pulling force in movement such that the release film 10 is peeled from the surface of the original film 11.

Further, the film peeling method may further comprise: providing a supporting shaft 110 and rotating the peeling belt 200 about the film peeling roller 100, the first rotation shaft 101 and the supporting shaft 110.

The supporting shaft 110 has an axis (not shown) in parallel to that (O-O') of the first rotation shaft.

In this way, as long as a section of peeling belt 200 is wound on the film peeling roller 100, the first rotation shaft 101 and the supporting shaft 110 to achieve the movement of rotation, the peeling belt 200 may be recycled. In addition, different positions and dimensions of various components of the film peeling apparatus may be adapted by adjusting the distance among the supporting shaft 110, the film peeling roller 100 and the first rotation shaft 101.

As an example, as illustrated in FIG. 5, when the first rotation shaft 101 rotates, the peeling belt 200 may be wound on the first rotation shaft 101 such that the peeling belt 200 is recycled. Further, a feeding roller 14 is arranged on one side of the film peeling roller 100, for providing the peeling belt 200 to be unwound. During peeling film, when all of the peeling belts 200 have been wound on the first rotation shaft 101, the roll-shaped peeling belt 200 on the first rotation shaft 101 is taken off and mounted onto the feeding roller 14. In this way, the peeling belt 200 can be recycled.

Further, the film peeling method may further comprise: providing a second rotation shaft 102 and a positioning belt 201, the positioning belt 201 being in contact with the peeling belt 200, the positioning belt 201 and the peeling belt 200 rotating about the second rotation shaft 102, the supporting shaft 110 and the film peeling roller 100.

The positioning belt 201 limits the movement of the peeling belt 201 in an axis direction of the first rotation shaft 101 (as indicated by the dashed lines in FIG. 6). It should be noted that both the upper surface and the lower surface of the original film 11 may be adhered with the release film 10. Thus, the film peeling apparatus for peeling the release film 10 may be provided symmetrically on the upper surface and the lower surface of the original film 11. For example, the film peeling apparatus located on the upper surface of the original film 11 comprises: the film peeling roller 100, the first rotation shaft 101, the second rotation shaft 102, two supporting shafts 110, the peeling belt 200 wound on the above components for rotating and the positioning belt 201 contacting with the peeling belt 200 and wound on the film peeling roller 100, the second rotation shaft 102 and the two supporting shafts 110 to rotate.

The second rotation shaft 102 has an axis (not shown) in parallel to that (O-O') of the first rotation shaft 101. Thus, the positioning belt 201 may limit the movement of the peeling belt 200 in the axial direction of the first rotation shaft 101. If the peeling belt 200 moves in the axial direction of the first rotation shaft 101, it will be misaligned with the release film 10 such that the release film 10 cannot be peeled from the original film 11 to cause failure of the film peeling process.

In particular, when both the peeling belt 200 and the positioning belt 201 rotate about the film peeling roller 100, the second rotation shaft 102 and the supporting shaft 110, the peeling belt 200 and the positioning belt 201 are in contact with each other and the positioning belt 201 limits the position of the peeling belt 200. When the peeling belt 200 is wound on the first rotation shaft 101, the peeling belt 200 is separated from the positioning belt 201 and contacts with the release film 10 such that the release film 10 may be peeled by the peeling belt 200 from the surface of the original film 11.

Further, the above film peeling method may further comprise: providing the first rotation shaft 101 within the recycling box 202, at first, such that the peeling belt 200 wound on the surface of the first rotation shaft 101 can bring the release film 10 adhered to the peeling belt 200 into the recycling box 202; then the first rotation shaft rotates, and the release film 10 is brought into the recycling box 202 through a recycling opening 2020 of the recycling box 202 by the peeling belt 200 to make the release film 10 fall within the recycling box 202. As illustrated in FIG. 9, the recycling opening 2020 is opened in a direction (M direction) in parallel to the axis (O-O') of the first rotation shaft. As the peeling belt 200 is non-sticky, the release film 10 will fall into the recycling box 202 after the release film 10 is peeled by the peeling belt 200 from the surface of the original film 11 and is brought into the recycling box 202. In this way, the release film 10 may be recycled to improve the chance of being reused and reduce costs. In addition, as all of the peeled release films 10 have recycled into the recycling box 202, the release film 10 may be prevented from being polluted by other contaminations in the processing environments.

Further, the recycling box 202 is provided with an extracting port 2021. The extracting port 2021 is opened and the release film 10 fallen within the recycling box 202 can be taken out. In this way, it may prevent creases or scratches on the surface of the release film 10 due to excessive accumulation of the release films 10 in the recycling box 202.

Further, the film peeling method may further comprise: conveying the peeling belt 200 out of the recycling box 202 from a peeling belt exit 2022 of the recycling box 202. In this way, the peeling belt 200 may rotate continuously about the film peeling roller 100, the first rotation shaft 101, the second rotation shaft 102 and the supporting shaft 110 to achieve recycling of the peeling belt 200.

Although several exemplary embodiments have been shown and described, the present invention is not limited to those and it would be appreciated by those skilled in the art that various changes or modifications may be made in these embodiments without departing from the principles and spirit of the disclosure. These changes or modifications also fall within the scope of the present invention. The scope of the present invention is defined in the claims and their equivalents.

What is claimed is:

1. A film peeling apparatus, comprising:
    a film peeling roller;
    at least one peeling belt;
    at least one first rotation shaft which is configured to drive the peeling belt to rotate,
    the film peeling roller being sufficiently sticky such that when the film peeling roller rotates, the film peeling roller sticks to the film peeling belt and a release film such that the release film is peeled from an original film:
    the film peeling apparatus further comprising:
    at least one supporting shaft configured to allow the at least one peeling belt to rotate about the film peeling roller, the at least one first rotation shaft and the at least one supporting shaft,
    wherein the at least one supporting shaft has an axis of rotation parallel to an axis of rotation of the at least one first rotation shaft;
    a positioning belt and at least one second rotation shaft,
    wherein the positioning belt is in contact with the peeling belt, the positioning belt and the peeling belt rotate about the at least one second rotation shaft, the at least one supporting shaft and the film peeling roller, and the positioning belt is configured to limit the movement of the at least one peeling belt in an axial direction of the at least one first rotation shaft,
    wherein the at least one second rotation shaft has an axis of rotation parallel to the axis of rotation of the at least one first rotation shaft.

2. The film peeling apparatus according to claim 1, wherein a surface of the positioning belt in contact with the peeling belt is provided with at least one groove within which the peeling belt is fixed.

3. The film peeling apparatus according to claim 1, wherein the surface of the positioning belt in contact with the peeling belt is provided with at least one pattern which is configured to increase a frictional force between the peeling belt and the positioning belt.

4. The film peeling apparatus according to claim 1, wherein the film peeling apparatus further comprises a recycling box, within which the at least one first rotation shaft is located,
    wherein the recycling box is provided with a recycling opening which is opened in a direction in parallel to the axis of rotation of the at least one first rotation shaft, and, the recycling opening is configured such that, during rotation of the at least one first rotation shaft, the release film is brought into the recycling box by the peeling belt and falls within the recycling box.

5. The film peeling apparatus according to claim 4, wherein the recycling box is further provided with an extracting port configured to take out the release film fallen within the recycling box.

6. The film peeling apparatus according to claim 5, wherein the recycling box is further provided with a peeling belt exit configured to convey the at least one peeling belt out of the recycling box.

7. The film peeling apparatus according to claim 1, wherein the at least one first rotation shaft is configured such that the at least one peeling belt is able to be wound on the first rotation shaft; and wherein the film peeling apparatus further comprises a feeding roller configured to feed the at least one peeling belt.

8. A film peeling method for a film peeling apparatus, the method comprising:
    rotating a film peeling roller and a first rotation shaft;
    driving at least one peeling belt to rotate by the first rotation shaft;
    when the film peeling roller rotates, the film peeling roller sticks to the at least one film peeling belt and a release film by virtue of sufficiently sticky characteristics of the film peeling roller, such that the release film is peeled from an original film;
    providing a supporting shaft and rotating the at least one peeling belt about the film peeling roller, the first rotation shaft and the supporting shaft,
    wherein the supporting shaft has an axis of rotation parallel to an axis of rotation of the first rotation shaft;

providing a second rotation shaft and a positioning belt, the positioning belt being in contact with the peeling belt, and, rotating the positioning belt and the at least one peeling belt about the second rotation shaft, the supporting shaft and the film peeling roller, and limiting the movement of the at least one peeling belt in an axial direction of the first rotation shaft by the positioning belt.

9. The film peeling method according to claim 8, further comprising:

providing a recycling box;

providing the first rotation shaft within the recycling box; and when the first rotation shaft rotates, bringing the release film into the recycling box through a recycling opening of the recycling box by the at least one peeling belt to make the release film fall within the recycling box.

10. The film peeling method according to claim 9, further comprising:

opening an extracting port provided on the recycling box and taking out the release film fallen within the recycling box.

11. The film peeling method according to claim 10, further comprising:

conveying the at least one peeling belt out of the recycling box from a peeling belt exit of the recycling box.

* * * * *